(12) United States Patent
Adams

(10) Patent No.: US 7,416,378 B1
(45) Date of Patent: Aug. 26, 2008

(54) LOAD LIFT CONTROL SYSTEM

(76) Inventor: Bill J. Adams, 2719 40th Ave. North, Fargo, ND (US) 58102

( * ) Notice: Subject to any disclaimer, the term of this patent is extended or adjusted under 35 U.S.C. 154(b) by 18 days.

(21) Appl. No.: 11/530,964

(22) Filed: Sep. 12, 2006

(51) Int. Cl.
*B60P 1/02* (2006.01)
(52) U.S. Cl. .................... 414/679; 414/495; 254/93 HP
(58) Field of Classification Search ............... 298/22 R; 414/540, 679; 410/87; 254/93 HP
See application file for complete search history.

(56) References Cited

U.S. PATENT DOCUMENTS

| | | | |
|---|---|---|---|
| 2,070,960 A | | 2/1937 | Phillips |
| 2,821,409 A | | 1/1958 | Chalmers |
| 2,999,681 A | | 9/1961 | Muller et al. |
| 3,208,770 A | | 9/1965 | Freltas et al. |
| 3,213,993 A | | 10/1965 | Long |
| 3,227,470 A | * | 1/1966 | Funk ....................... 280/407.1 |
| 3,380,758 A | | 4/1968 | Granning |
| 3,580,609 A | * | 5/1971 | Paielli ..................... 280/407.1 |
| 3,711,157 A | * | 1/1973 | Smock ....................... 298/8 R |
| 3,719,299 A | * | 3/1973 | Oehler ....................... 414/495 |
| 3,730,366 A | * | 5/1973 | Berends ..................... 414/495 |
| 3,752,502 A | * | 8/1973 | Ehler ......................... 280/440 |
| 3,774,942 A | | 11/1973 | Holland |
| 3,776,573 A | * | 12/1973 | Paielli ..................... 280/407.1 |
| 4,227,843 A | * | 10/1980 | Damm ......................... 410/54 |
| 4,461,455 A | * | 7/1984 | Mills et al. ................. 254/3 R |
| 4,580,806 A | | 4/1986 | Kolstad et al. |
| 4,986,177 A | | 1/1991 | Masek et al. |
| 5,067,774 A | * | 11/1991 | Trowland ..................... 298/1 A |
| 5,120,184 A | * | 6/1992 | Gerawan ..................... 414/495 |
| 5,161,935 A | * | 11/1992 | Pelz et al. ................... 414/679 |
| 5,388,849 A | | 2/1995 | Arsenault |
| 5,411,360 A | * | 5/1995 | Hilliker et al. ............... 414/608 |
| 5,467,827 A | * | 11/1995 | McLoughlin ................. 169/24 |
| 5,506,012 A | * | 4/1996 | Wright et al. ............... 428/35.2 |
| 5,560,684 A | * | 10/1996 | Gilmore ................... 298/22 R |
| 5,639,106 A | | 6/1997 | Vitale et al. |
| 5,785,341 A | | 7/1998 | Fenton |
| 5,975,643 A | | 11/1999 | Smith et al. |
| 6,254,192 B1 | * | 7/2001 | Spreitzer ................... 298/22 R |
| 6,267,448 B1 | * | 7/2001 | Hendry et al. ............. 298/22 R |
| 6,286,805 B1 | * | 9/2001 | Bunn et al. ................... 248/544 |
| 6,746,037 B1 | * | 6/2004 | Kaplenski et al. ........... 280/484 |
| 6,786,509 B2 | | 9/2004 | Lang et al. |
| 6,857,643 B2 | | 2/2005 | Neider |
| 6,993,798 B1 | * | 2/2006 | Roberts ......................... 5/118 |
| 2004/0184903 A1 | | 9/2004 | Neider |
| 2008/0001130 A1 | * | 1/2008 | Dibdin ................... 254/93 HP |

FOREIGN PATENT DOCUMENTS

GB 1055463 1/1967

* cited by examiner

*Primary Examiner*—James Keenan

(57) ABSTRACT

A load lift control system for efficiently elevating and lowering a load placed upon a trailer. The load lift control system includes a control unit, an air bladder unit attached to a trailer and inflatable by the control unit and a support unit attached to an upper end of the air bladder unit, wherein the support unit elevates and lowers a load placed upon the support unit when the air bladder unit is inflated and deflated.

6 Claims, 7 Drawing Sheets

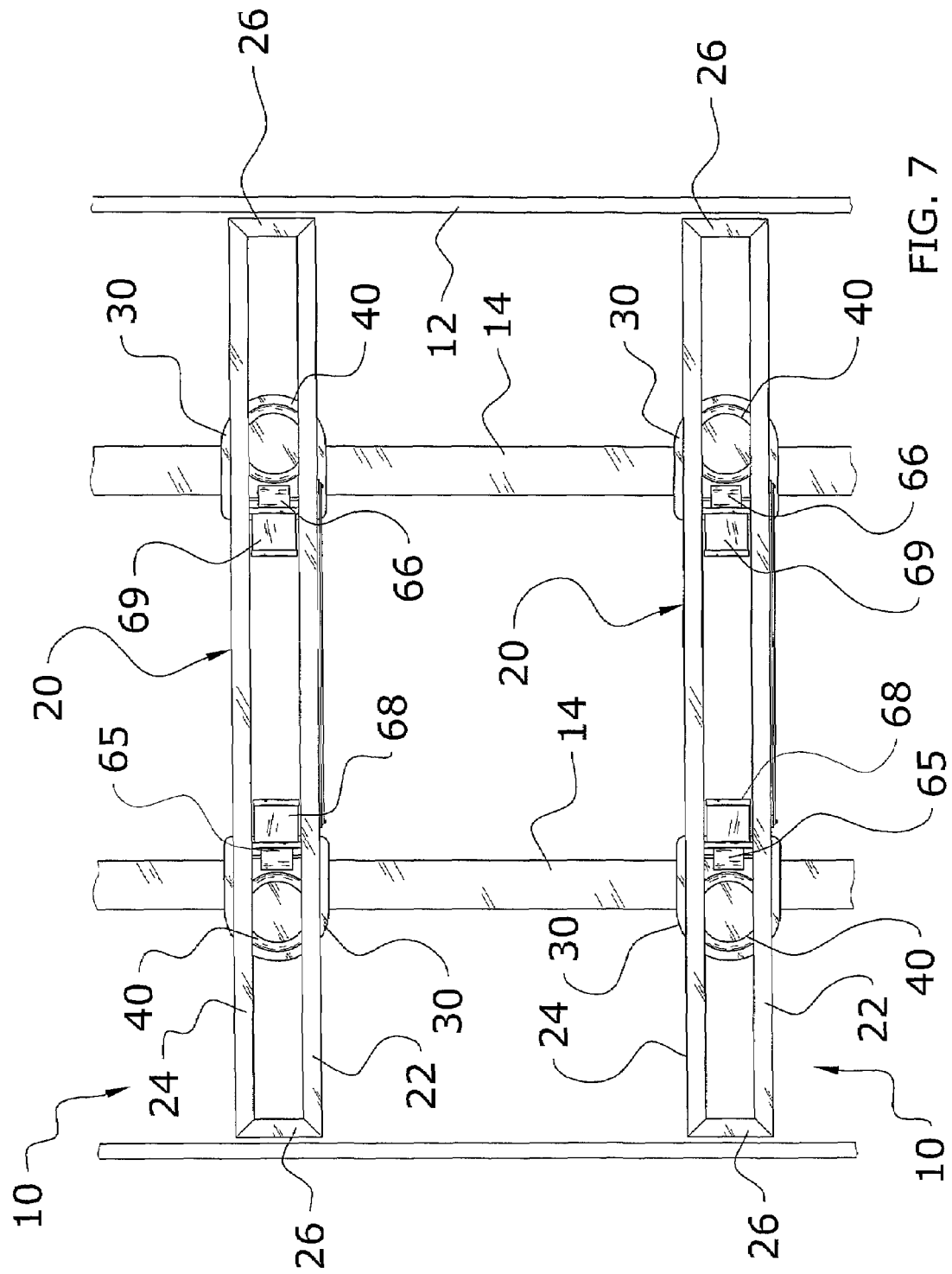

LOAD LIFT CONTROL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to trailers and more specifically it relates to a load lift control system for efficiently elevating and lowering a load placed upon a trailer.

2. Description of the Related Art

Any discussion of the prior art throughout the specification should in no way be considered as an admission that such prior art is widely known or forms part of common general knowledge in the field.

Trailers have been in use for years. Typically, trailers and semi-trailers have a flat bed for hauling products or loads. A forklift or other lifting device is generally used to lift the product away from the floor and remove the product from the trailer. Forklifts generally have two forks that extend from the forklift and under the product to be lifted. These forks are often very heavy, making them somewhat difficult to control accurately.

Since the product generally sits on the floor of the trailer or on a small crate, the forks of the forklift must get very close to the trailer bed. Often times, the operator of the forklift may lower the forks too far and damage the floor of trailer. It is also common for the operator to not lower the forks enough and run into the product with the forks of the forklift, thus damaging the product.

While these devices may be suitable for the particular purpose to which they address, they are not as suitable for efficiently elevating and lowering a load placed upon a trailer. By elevating the product placed upon a trailer, it may be easier to load and unload the product from the trailer. This decreases the likelihood of damaging the floor of the trailer with the forks of the forklift. It may also be easier to tell the exact height of the forks, since they would be closer to eye level.

In these respects, the load lift control system according to the present invention substantially departs from the conventional concepts and designs of the prior art, and in so doing provides an apparatus primarily developed for the purpose of efficiently elevating and lowering a load placed upon a trailer.

BRIEF SUMMARY OF THE INVENTION

In view of the foregoing disadvantages inherent in the known types of trailers now present in the prior art, the present invention provides a new load lift control system construction wherein the same can be utilized for efficiently elevating and lowering a load placed upon a trailer.

The general purpose of the present invention, which will be described subsequently in greater detail, is to provide a new load lift control system that has many of the advantages of the trailers mentioned heretofore and many novel features that result in a new load lift control system which is not anticipated, rendered obvious, suggested, or even implied by any of the prior art trailers, either alone or in any combination thereof.

To attain this, the present invention generally comprises a control unit, an air bladder unit attached to a trailer and inflatable by the control unit and a support unit attached to an upper end of the air bladder unit, wherein the support unit elevates and lowers a load placed upon the support unit when the air bladder unit is inflated and deflated.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a load lift control system that will overcome the shortcomings of the prior art devices.

A second object is to provide a load lift control system for efficiently elevating and lowering a load placed upon a trailer.

Another object is to provide a load lift control system that allows for easier loading of a product onto a trailer.

An additional object is to provide a load lift control system that allows for easier unloading of a product onto a trailer.

A further object is to provide a load lift control system that reduces the damage to trailer beds while loading and unloading a product.

Another object is to provide a load lift control system that reduces damage to products while they are being unloaded from a trailer bed.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 7 is a top view of two present inventions attached to a trailer.

DETAILED DESCRIPTION OF THE INVENTION

A. Overview

Figure 1:
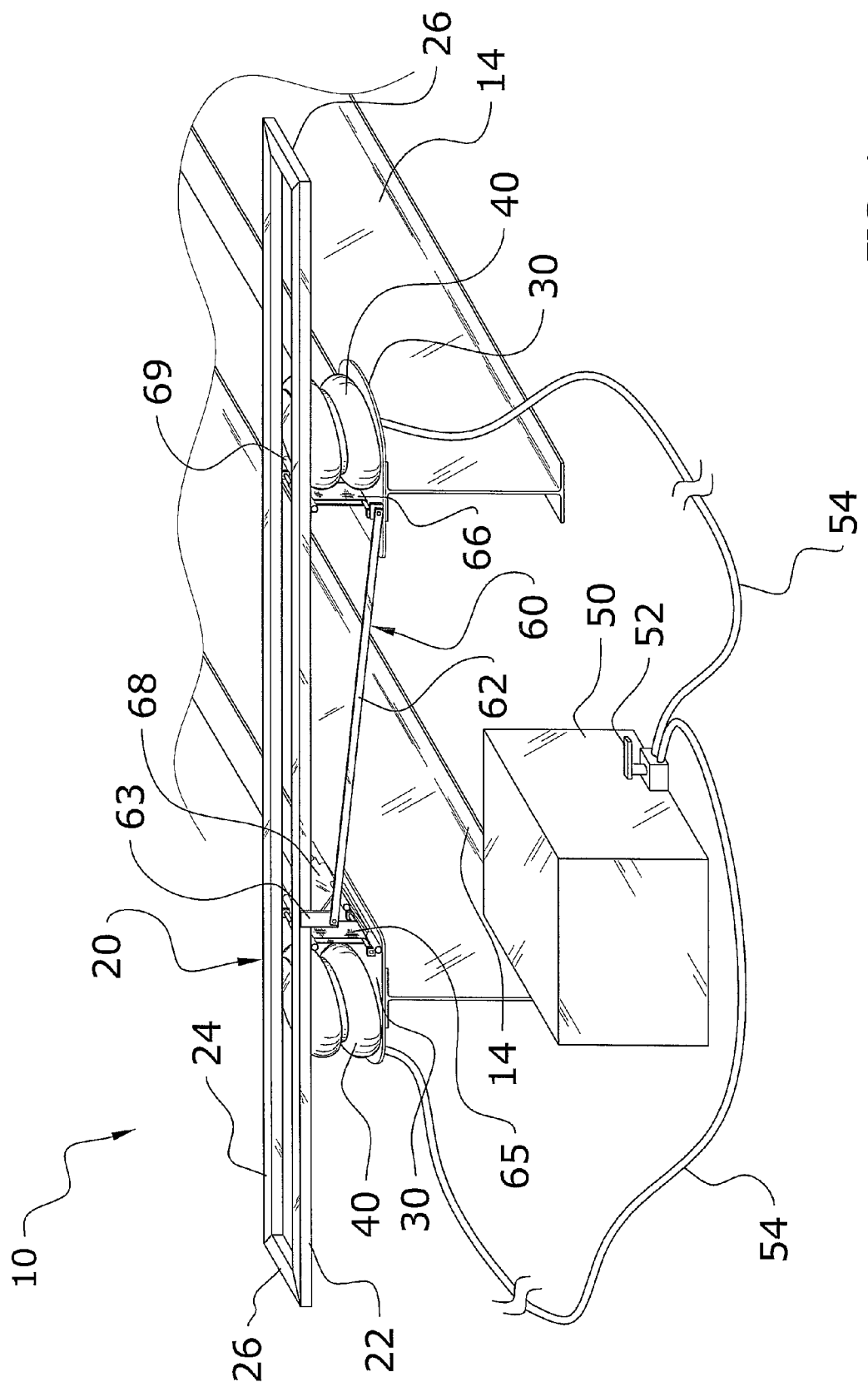
FIG. 1 is an upper perspective view of the present invention attached to a pair of support beams.

Turning now descriptively to the drawings, in which similar reference characters denote similar elements throughout the several views, FIGS. 1 through 6 illustrate a load lift control system 10, which comprises a control unit 50, an air bladder unit 40 attached to a trailer 12 and inflatable by the control unit 50 and a support unit 20 attached to an upper end of the air bladder unit 40, wherein the support unit 20 elevates and lowers a load 18 placed upon the support unit 20 when the air bladder unit 40 is inflated and deflated.

B. Lower Support

There is preferably a lower support 30 attached to the top of a support beam 14 of a trailer 12, as shown in FIGS. 1 through 7. The lower support 30 is preferably comprised of a substantially planar structure and configuration. The lower support 30 is also preferably comprised of a thin metal structure. The lower support 30 preferably provides a surface on which to mount the air bladder unit 40. There preferably exists as many lower supports 30 as there are air bladder units 40.

C. Air Bladder Unit

The air bladder unit 40 is preferably comprised of a plurality of bellows, preferably two, an upper mounting plate and an air inlet. A lower end of the air bladder unit 40 is preferably attached to the lower support 30. As shown in FIGS. 1 through 7, the bellows are connected in series above one another and inflate in a vertical manner to function as a lifting device. The bellows are constructed of a rubber material which is very strong and resilient to withstand high air pressure. The upper mounting plate is attached to the upper bellow and is used for connecting to the support unit 20. The air inlet is located at a lower surface of the lower bellow and can be connected to an air line 54 using many different methods (e.g. quick connect or threaded).

There are preferably a pair of air bladder units 40 that elevate the support unit 20. The air lines 54 that connect to the lower bellow of the air bladder unit 40 run back to the control unit 50, as shown in FIG. 1. The control unit 50 is preferably comprised of an air compressor. The control unit 50 also includes a valve 52. The valve 52 opens and closes the air lines 54 that run to air bladder units 40. There preferably exists one control unit 50 for each load lift control system.

There is also preferably a separate switch to stop the air bladder unit 40 from releasing air. The switch is preferably of a tractor protection valve structure and configuration. When the switch is activated the air line 54 connecting air bladder unit 40 is opened up allowing the air bladder unit 40 to fill up with compressed air. The switch is able to hold an air pressure of 60 psi or more in the air bladder units 40. The switch is preferably in a close proximity to the support unit 20.

D. Support Unit

Figure 2:
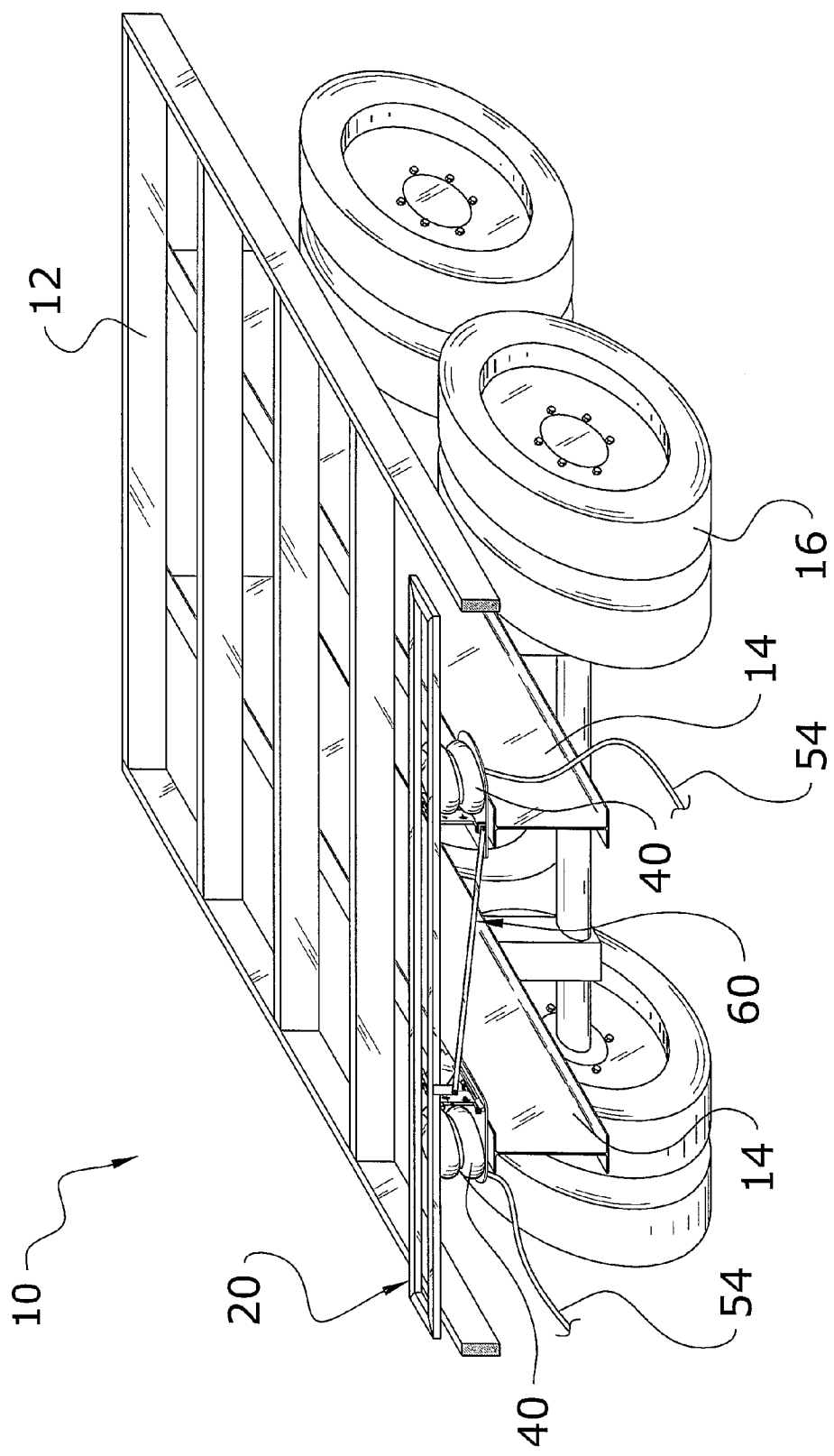
FIG. 2 is an upper perspective of the present invention attached to a trailer.

The support unit 20 is preferably comprised of a square tubular structure and configuration as illustrated in FIGS. 1 and 2. The support unit 20 is of a sufficient strength to support many various loads 18. The support unit 20 is preferably comprised of a rectangular shape and configuration. The support unit 20 preferably includes a first member 22 and a second member 24. The first member 22 and the second member 24 are preferably of a substantially similar structure and configuration.

The first member 22 and the second member 24 are preferably of an elongated structure to equal the width of the trailer 12. The first member 22 and the second member 24 are connected by a pair of side members 26. The side members 26 attach the first member 22 to the second member 24 on both ends of the first member 22 and the second member 24, as shown in FIGS. 1, 2 and 7.

Figure 3:
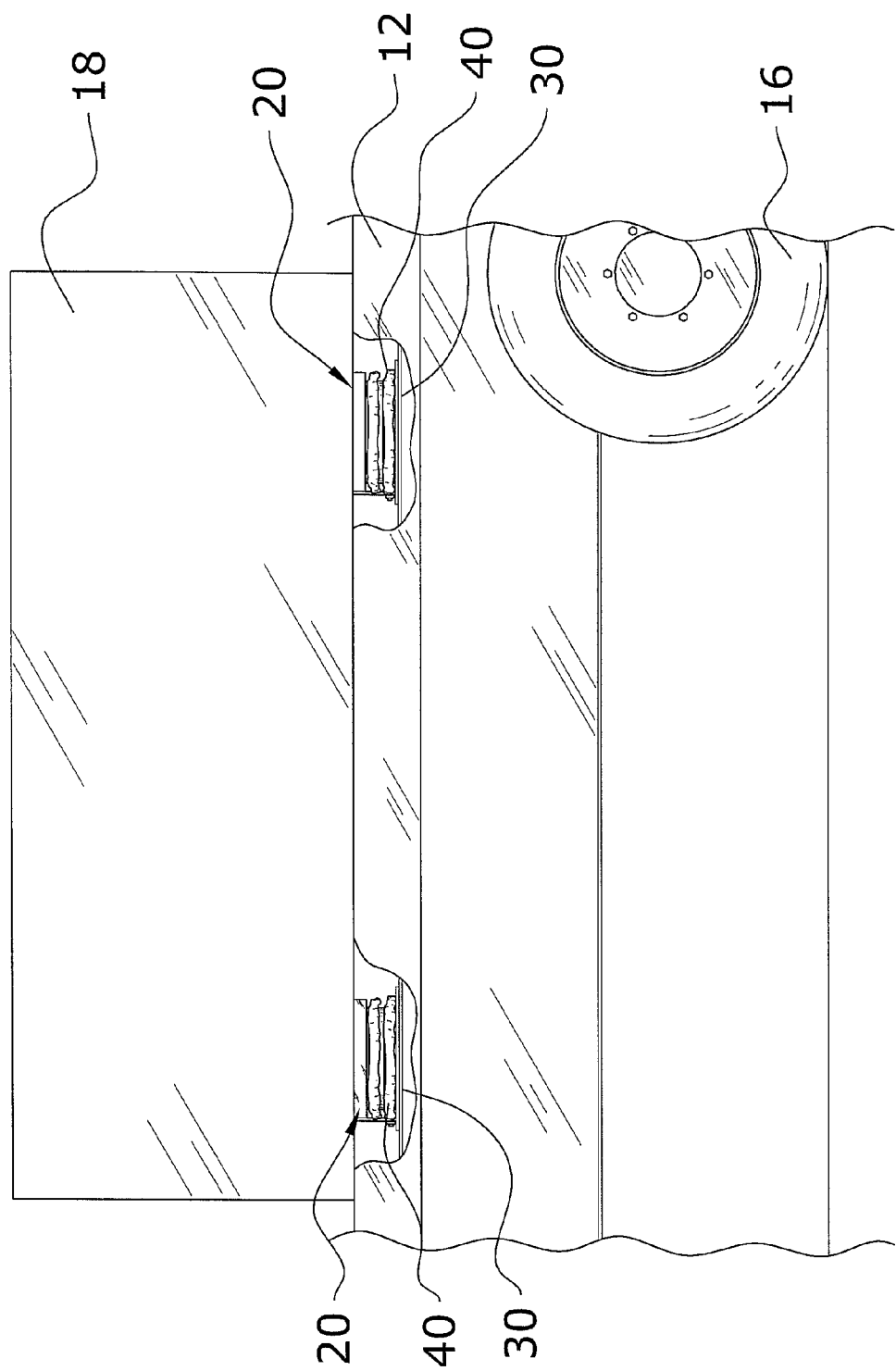
FIG. 3 is a side view of the present invention attached to a trailer, where the trailer has a load place upon it and with the air bags deflated.
Figure 4:
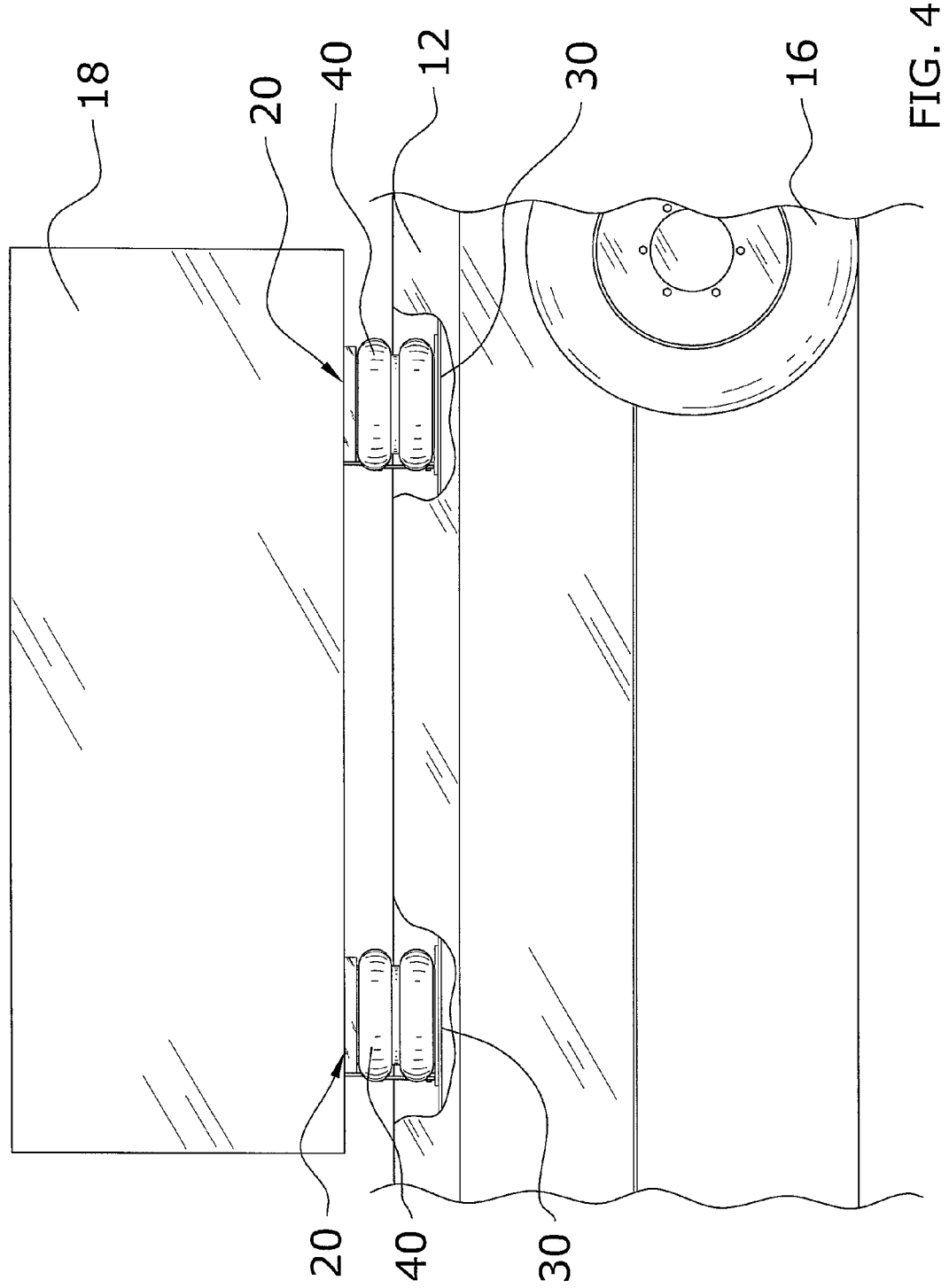
FIG. 4 is a side view of the present invention attached to a trailer with the air bags inflated and elevating the load.
Figure 5:
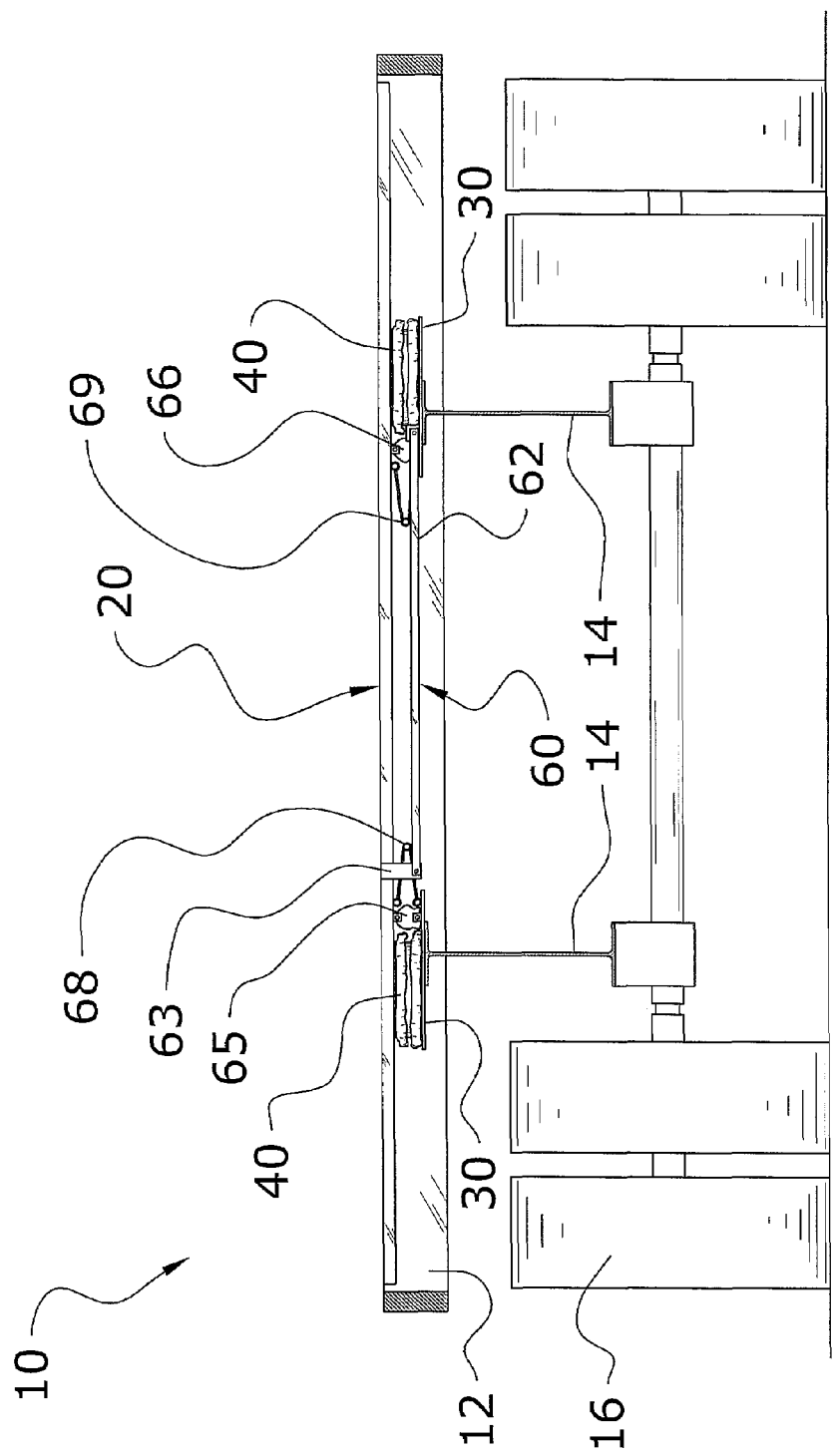
FIG. 5 is a rear view of the present invention attached to a trailer with the air bags deflated.
Figure 6:
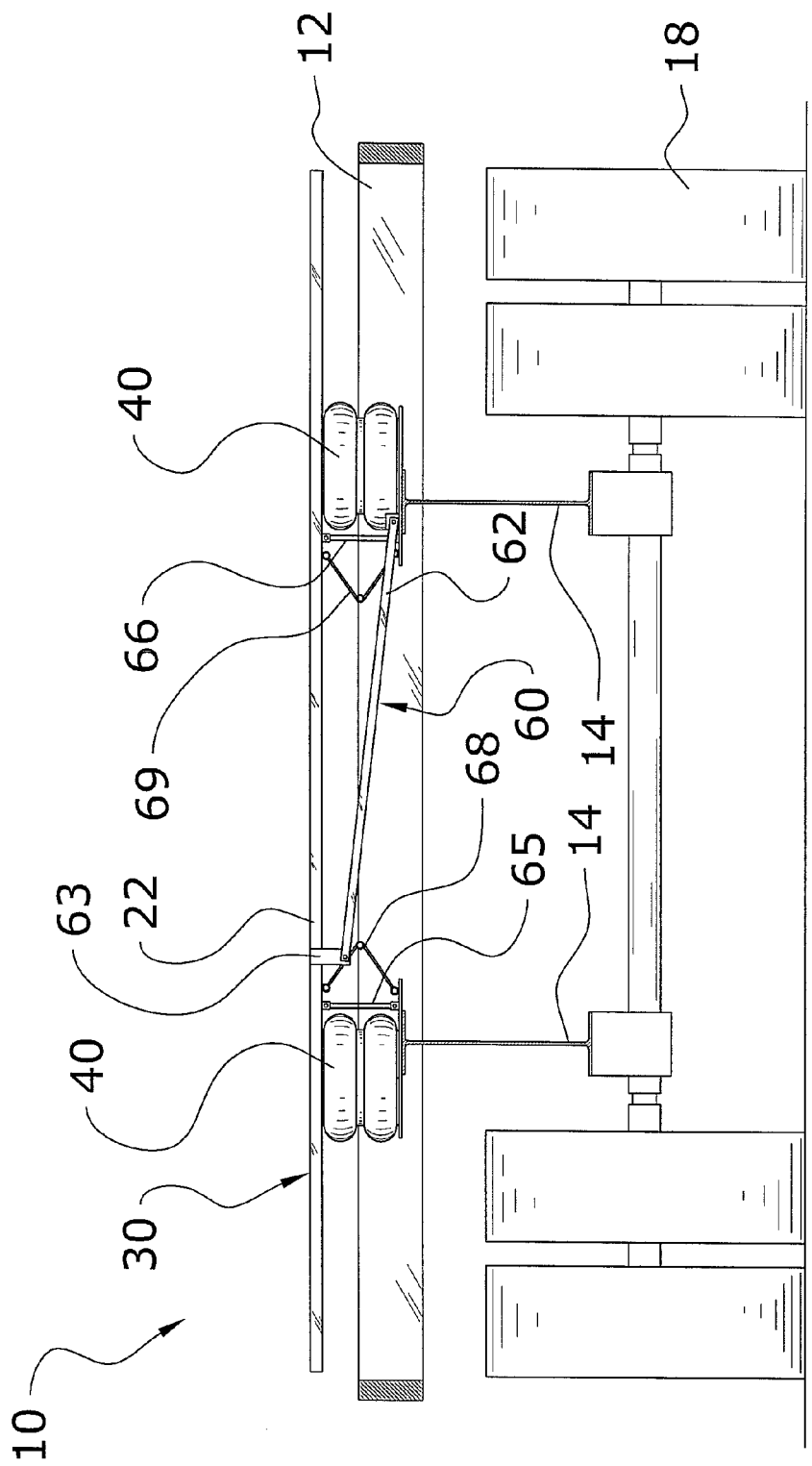
FIG. 6 is a rear view of the present invention attached to a trailer with the air bags inflated.

The top of the support unit 20 preferably has a same vertical height as the top of the trailer 12 bed when the air bladder units 40 are deflated, as shown in FIGS. 3 and 5. When the air bladder units 40 are inflated the support unit 20 is of a substantially greater height than the trailer 12 bed, as shown in FIGS. 4 and 6. There may be multiple support units 20 and thus, load lift control systems present in a single trailer 12, as shown in FIG. 7

E. Stabilizing Unit

The support unit 20 is preferably stabilized to the trailer 12 through a plurality of bars, straps and hinges, as shown in FIGS. 1 through 7. A stabilizing unit 60 prevents the support unit 20 from swaying side to side. The stabilizing unit 60 preferably includes a third member 62 and a fourth member 63. The third member 62 extends from one air bladder unit 40 to the other air bladder unit 40, as shown in FIG. 1. An end of the third member 62 is preferably secured to the lower support 30 and the opposite end of the third member 62 is preferably secured to the fourth member 63. The fourth member 63 extends vertically downward from the support unit 20. The stabilizing unit 60 pivots on each of the ends while the support unit 20 is being elevated and lowered.

The support straps preferably include a first strap 65 and a second strap 66. The first strap 65 and the second strap 66 are preferably connected to the lower support 30 on one end and to the support unit 20 on the opposite end. The first strap 65 and the second strap 66 are preferably of a length equal to the vertical height from the lower support 30 to the support unit 20 when the air bladder unit 40 is inflated. The straps prevent the support unit 20 from swaying side to side. The support straps also serve as limiting straps to stop the support unit 20 from rising above a desired position.

The hinges of the support unit 20 preferably include a first hinge 68 and a second hinge 69. The first hinge 68 and the second hinge 69 are preferably attached to the lower support 30 on one end and the support unit 20 on the other end. The hinges help to keep the support unit 20 from swaying forward and back. The hinges also help to ensure the support unit 20 is being elevated and lowered substantially perpendicular to the trailer 12.

F. In Use

In use, the air bags are first inflated by starting up the control unit 50 and opening the valve 52, which allows air to flow through the air lines 54 and into the air bladder unit 40. The switch is also engaged until the air bladder units 40 are at the desired psi and the support unit 20 is at the desired height.

The switch may now be disengage, which locks the air pressure in the air bladder unit 40.

The load 18 may now be placed upon the support unit 20 of the load lift control system, as shown in FIG. 4. The support unit 20 may now be lowered by deflating the air bladder units 40. When the support unit 20 is at its lowest point the load 18 may be secured to the trailer 12. When removing the load 18 from the trailer 12, the air bladder units 40 are once again inflated, simultaneously raising the support unit 20 and the load 18.

When the support unit 20 is at a desired height the load 18 is removed from the trailer 12 by forklift or any other means. Another load 18 may now be placed upon the support unit 20 of the load 18 lift control system or the bags may be deflated, as shown in FIG. 5. This process is repeated for further loads 18.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A load lift control system, comprising:
   a trailer comprised of a plurality of support beams, a plurality of wheels and a trailer bed supported upon said support beams;
   a plurality of support units, wherein each of said plurality of support units extend substantially traversely with respect to a longitudinal axis of said trailer;
   wherein said plurality of support units are spaced apart from one another sufficient to allow a pair of forks from a forklift to extend between thereof when said plurality of support units are in a raised position;
   wherein said plurality of support units are to support, elevate and lower a load positioned upon said plurality of support units;
   wherein said plurality of support units are maintained in a substantially level state in both said raised position and in a lowered position;
   a plurality of air bladder units attached to said trailer and to a bottom portion of said plurality of support units to adjust a vertical position of said plurality of support units;
   a pressurized air source fluidly connected to said plurality of air bladder units to elevate said plurality of support units to said raised position or to lower said plurality of support units to said lowered position while maintaining said plurality of support units substantially level;
   a plurality of cross members attached between said trailer and said plurality of support units, wherein said plurality of cross members extend substantially traversely with respect to said longitudinal axis of said trailer to prevent side to side movement of said plurality of support units; and
   a plurality of hinges attached between said trailer and said plurality of support units, wherein a pivot axis for each of said plurality of hinges is substantially parallel with respect to said longitudinal axis of said trailer to prevent front to rear movement of said plurality of support units.

2. The load lift control system of claim 1, including a plurality of limiter straps attached between said trailer and said plurality of support units to limit the upward movement of said plurality of support units.

3. The load lift control system of claim 1, wherein said plurality of support units are each comprised of an elongated rectangular configuration.

4. The load lift control system of claim 1, wherein said plurality of support units each have a length approximately equal to a width of said trailer.

5. The load lift control system of claim 1, including a plurality of lower supports attached to an upper portion of said plurality of support beams of said trailer, wherein a lower end of said plurality of air bladder units is attached to said plurality of lower supports.

6. A load lift control system, comprising:
   a trailer comprised of a plurality of support beams, a plurality of wheels and a trailer bed supported upon said support beams;
   a plurality of support units, wherein each of said plurality of support units extend substantially traversely with respect to a longitudinal axis of said trailer;
   wherein said plurality of support units are spaced apart from one another sufficient to allow a pair of forks from a forklift to extend between thereof when said plurality of support units are in a raised position;
   wherein said plurality of support units are each comprised of an elongated rectangular configuration;
   wherein said plurality of support units each have a length approximately equal to a width of said trailer;
   wherein said plurality of support units are to support, elevate and lower a load positioned upon said plurality of support units;
   wherein said plurality of support units are maintained in a substantially level state in both said raised position and in a lowered position;
   a plurality of air bladder units attached to said trailer and to a bottom portion of said plurality of support units to adjust a vertical position of said plurality of support units;
   a pressurized air source fluidly connected to said plurality of air bladder units to elevate said plurality of support units to said raised position or to lower said plurality of support units to said lowered position while maintaining said plurality of support units substantially level;
   a plurality of cross members attached between said trailer and said plurality of support units, wherein said plurality of cross members extend substantially traversely with respect to said longitudinal axis of said trailer to prevent side to side movement of said plurality of support units;
   a plurality of lower supports attached to an upper portion of said plurality of support beams of said trailer, wherein a lower end of said plurality of air bladder units is attached to said plurality of lower supports;
   a plurality of hinges attached between said trailer and said plurality of support units, wherein a pivot axis for each of said plurality of hinges is substantially parallel with respect to said longitudinal axis of said trailer to prevent front to rear movement of said plurality of support units; and
   a plurality of limiter straps attached between said trailer and said plurality of support units to limit the upward movement of said plurality of support units.

* * * * *